(12) United States Patent
Waltham et al.

(10) Patent No.: US 7,381,450 B1
(45) Date of Patent: Jun. 3, 2008

(54) METHOD OF MANUFACTURING FLEXIBLE MAGNETIC TAPE

(75) Inventors: Richard Miller Waltham, Wiltshire (GB); Andrew Laurence Smith, Slough (GB)

(73) Assignee: TSSI Systems Limited, London (GB)

( * ) Notice: Subject to any disclaimer, the term of this patent is extended or adjusted under 35 U.S.C. 154(b) by 858 days.

(21) Appl. No.: 10/088,811

(22) PCT Filed: Sep. 22, 2000

(86) PCT No.: PCT/GB00/03634

§ 371 (c)(1),
(2), (4) Date: Dec. 3, 2003

(87) PCT Pub. No.: WO01/22411

PCT Pub. Date: Mar. 29, 2001

(30) Foreign Application Priority Data

Sep. 24, 1999 (GB) ................................. 9922516.1

(51) Int. Cl.
*H01F 1/00* (2006.01)
(52) U.S. Cl. ...................... 427/547; 427/130
(58) Field of Classification Search .............. 427/547, 427/130
See application file for complete search history.

(56) References Cited

U.S. PATENT DOCUMENTS

| 3,873,975 A | 3/1975 | Miklos et al. |
| 4,023,204 A | 5/1977 | Lee |
| 4,104,513 A | 8/1978 | Pearce |
| 5,834,748 A * | 11/1998 | Litman ....................... 235/450 |

* cited by examiner

*Primary Examiner*—Alain L. Bashore
(74) *Attorney, Agent, or Firm*—Martin Fleit; Paul D. Bianco; Fleit Kain Gibbons Gutman Bongini & Bianco, P.L.

(57) ABSTRACT

A method of manufacturing flexible magnetic tape having a permanently structured magnetic characteristic which varies from place to place in two different directions in the plane of the tape, includes:—a) coating a flexible substrate with a slurry having anisotropic magnetic particles; b) moving the substrate and slurry coating relative to a first magnetic field having a field strength which varies with time in a first direction, thereby selectively orienting the particles in areas spaced apart in a first direction; c) subsequently moving the substrate and slurry coating relative to a second magnetic field having a field strength which varies with time in a second direction making an oblique angle with the first direction, such that the magnetic particles are selectively oriented in spaced areas in both the first and further directions, and d) solidifying the slurry to fix the particles in place.

9 Claims, 4 Drawing Sheets

Previously known art of making structured magnetic tape

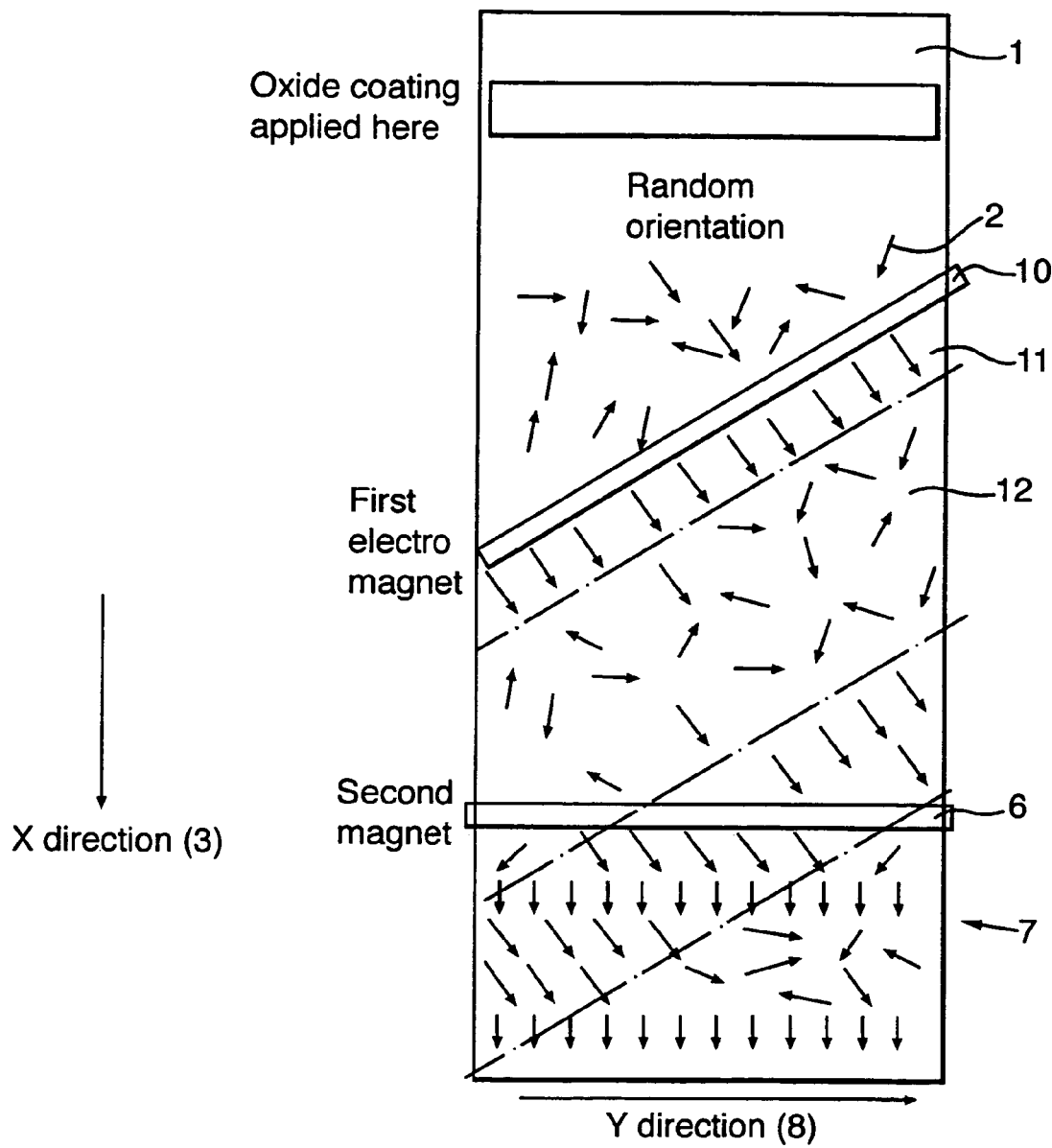

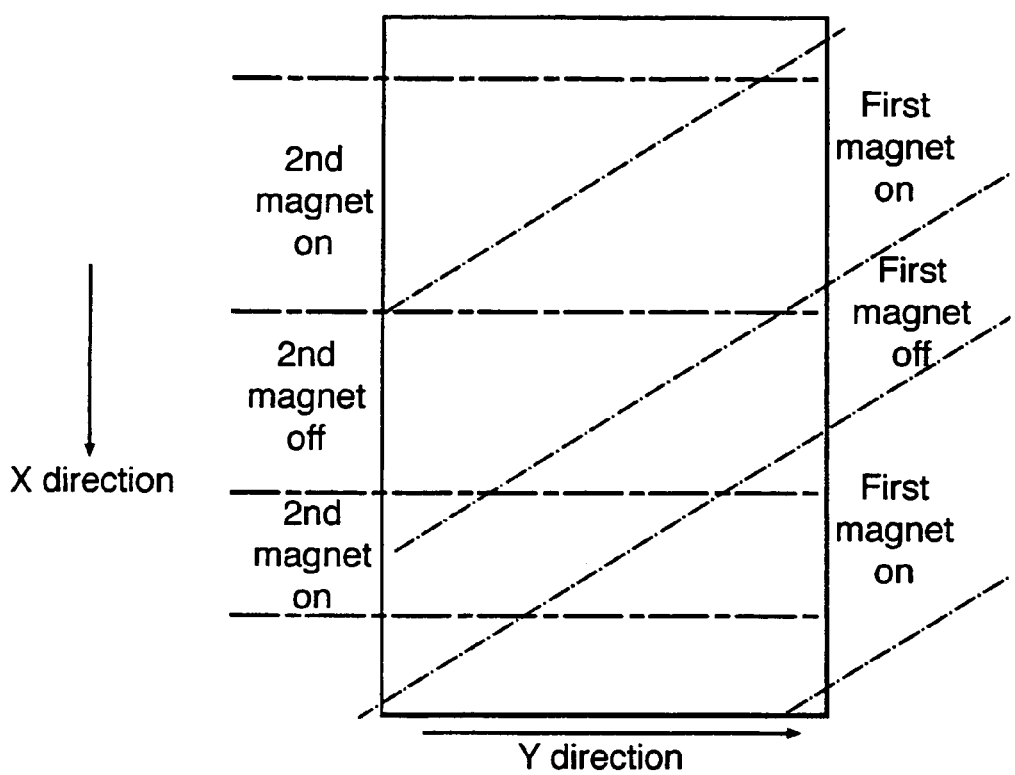
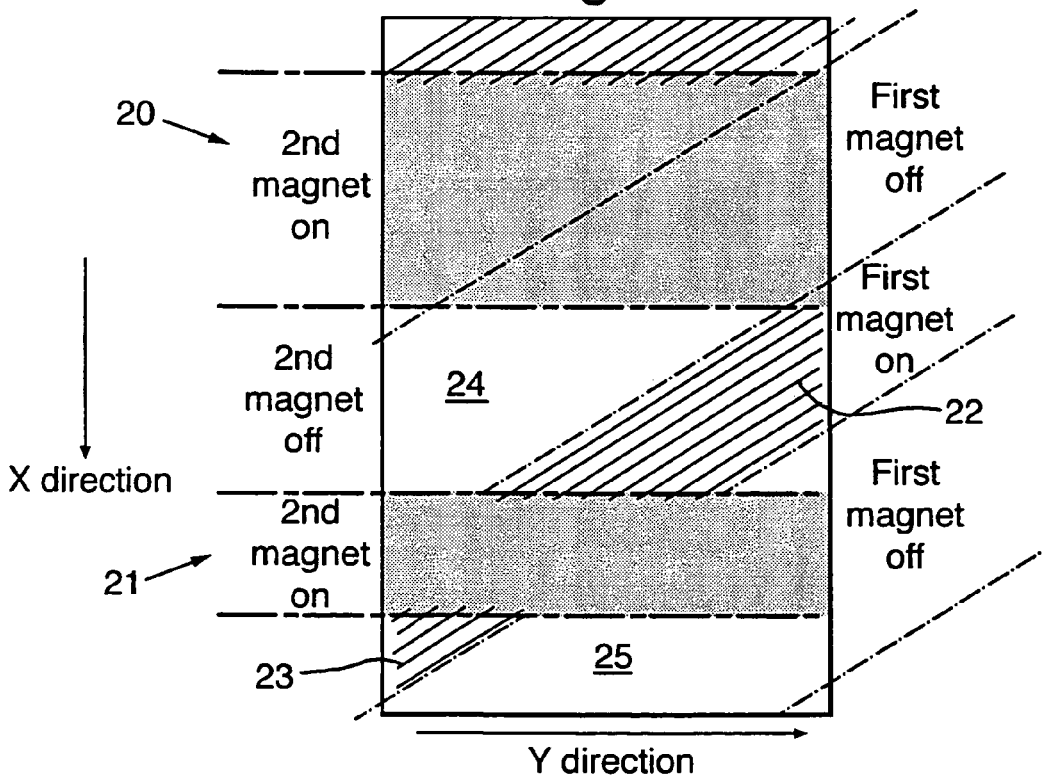

METHOD OF MANUFACTURING FLEXIBLE MAGNETIC TAPE

FIELD OF THE INVENTION

This invention relates to a method of manufacturing flexible magnetic tape having a permanently structured magnetic characteristic which varies from place to place in two different directions in the plane of the tape.

BACKGROUND OF THE INVENTION

A known method of manufacturing permanently structured magnetic tape is described in U.S. Pat. No. 4,023,204, and is shown schematically in FIG. 1. A flexible substrate such as a polyester film (1) is coated with a liquid slurry having anisotropic magnetic particles (such as for example acicular ferric oxide particles) (2) which have a generally random orientation. The coated substrate is moved in the direction of the arrow (3) past a first permanent magnet (4), which makes an oblique angle with the direction of motion of the substrate. This causes the particles (2) to become aligned as shown in area 5. The coated substrate continues to move in the direction of the arrow (3) past a further magnet (6), which is an electromagnet, and thus can generate a controllably variable magnetic field. This magnet is arranged to make an oblique angle with the direction of the first magnet. By switching the strength of the magnetic field being generated by the further magnet, the particles (2) become aligned as shown in area 7. The slurry is then solidified to fix the particles in place in the orientation shown in area 7. With this arrangement it will be noted that the magnetic properties of the coating are constant across the width of the substrate (8), but change in the direction of otion of the substrate (3). The substrate 1 is subsequently slit along its length (i.e. direction of arrow 3) to provide thin lengths of magnetic tape.

In a modification of the above method, disclosed in U.S. Pat. No. 3,873,975, data can be coded in direction 8 across the tape by substituting a segmented magnet with a plurality of independently controllable write heads for the electromagnet 6. This can provide the advantage that after slitting the substrate, each length of tape can have different data. This method is reasonably satisfactory for making permanently structured magnetic tape for use on ISO781X cards, where the width of tape reels required lie between 11 and 15 mm. Typically, 15 independent channels are created simultaneously across the substrate, each one 11-15 mm wide.

However, the method is unsuitable for manufacturing narrow tapes of the order of 1 or 2 mm across as might be embedded into banknotes, because of the lateral spreading of the magnetic field from each head of the further magnet. The method also has the disadvantage that many independent channel driver circuits are required, one for each write head. To make 1 mm wide threads, the required number of channels will increase by an order of magnitude (for example from 15 to 150). The cost of providing so many circuits, and checking the calibration of each one periodically, becomes increasingly high for narrow threads. It is an object of the present invention to mitigate the above disadvantages.

SUMMARY OF THE INVENTION

According to the present invention there is provided a method of manufacturing flexible magnetic tape. This method is advantageous for manufacturing magnetic security elements having a width of 2 mm or less, but can be employed to make any width of tape.

BRIEF DESCRIPTION OF THE DRAWINGS

Embodiments of the invention will now be described, by way of example only, with reference to the accompanying schematic drawings, in which:

FIGS. 2, 3 and 4 show a method according to the present invention,

DETAILED DESCRIPTION OF THE INVENTION

Figure 1:
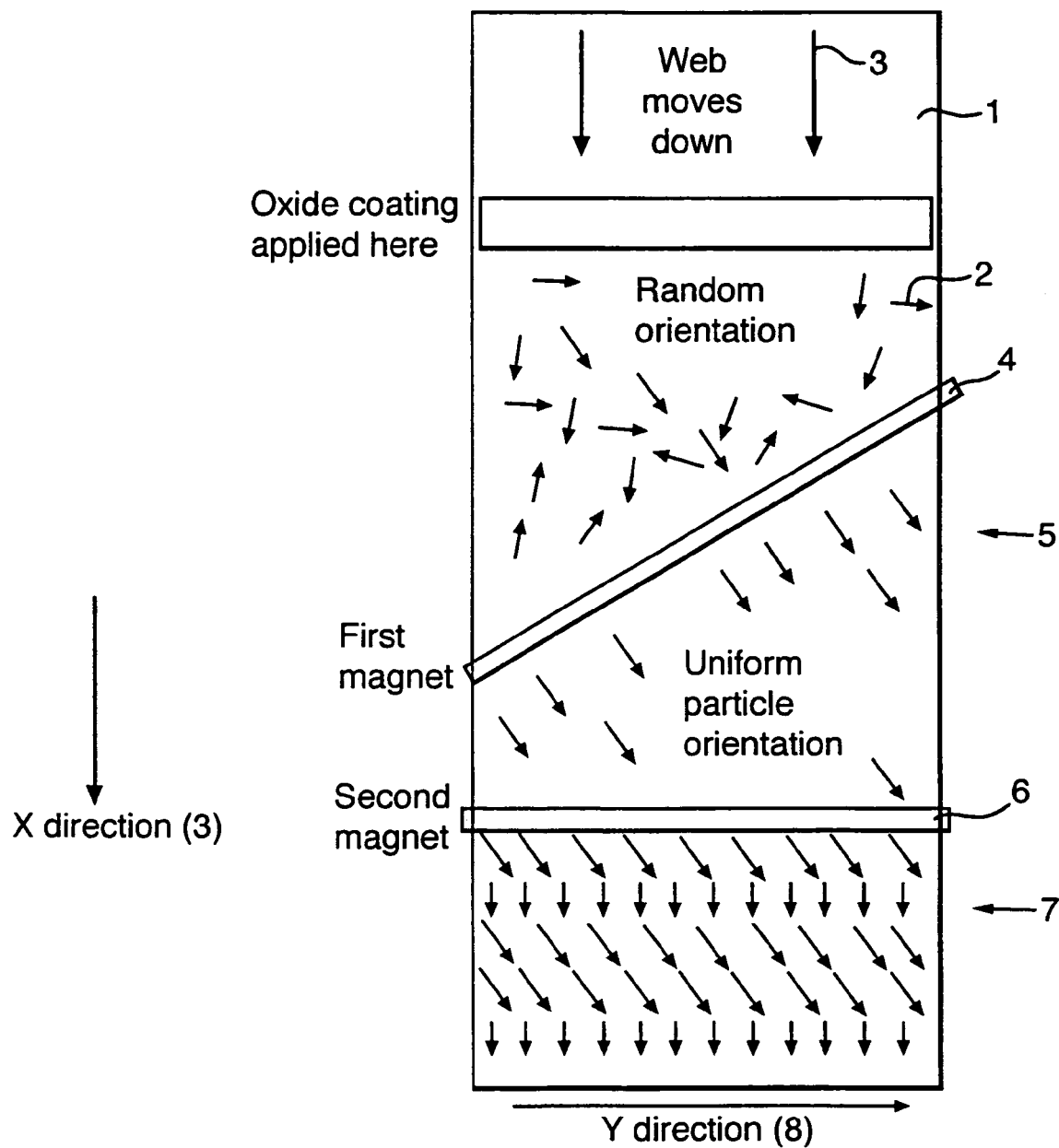
FIG. 1 shows a prior art method of manufacturing a flexible magnetic tape.

FIG. 2 shows a flexible substrate such as a polyester film (1), which is coated with a liquid slurry having anisotropic magnetic particles (such as for example acicular ferric oxide particles) (2) which have a generally random orientation. The coated substrate is moved in the direction of the arrow (3) past a first electromagnet (10), which makes an oblique angle with the direction of motion of the substrate and which can generate a controllably variable magnetic field. This causes the particles (2) to become aligned as shown in areas 11, or to remain randomly oriented as shown in area 12. The coated substrate continues to move in the direction of the arrow (3) past a further magnet (6), which is also an electromagnet, and thus can also generate a controllably variable magnetic field. This magnet is arranged to make an oblique angle with the direction of the first magnet. By switching the strength of the magnetic field being generated by the further magnet, the particles (2) become aligned as shown in area 7. The slurry is then solidified to fix the particles in place in the orientations shown. The substrate 1 is subsequently slit along its length (i.e. direction of arrow 3) to provide thin lengths of magnetic tape.

The oblique angle between the direction of orientation of the particles controlled by the respective electromagnets is preferably chosen so that both orientations can be sensed by the same read head. FIG. 3 shows the same magnetic tape as FIG. 2, but with the particle orientations removed to improve clarity. FIG. 4 shows the same tape with differently oriented areas having different hatching. The horizontal banding in FIG. 4 made by the further magnet is superimposed on the diagonal banding made by the first magnet.

Figure 8:
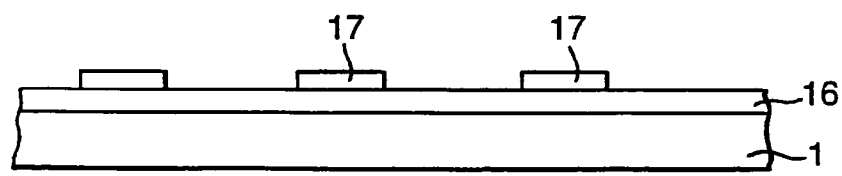
FIG. 8 shows a cross section of a further flexible magnetic tape according to the invention.

The essential feature of the present invention is to provide a detectable modulation of a detectable characteristic in two different directions making an oblique angle with one another. The oblique angle is chosen such that both modulations can be sensed by the same magnetic read head. In the above described embodiment this is achieved by patterning a single layer of magnetic particles using a pair of electromagnets having variable field strengths. There are, however, alternative ways of producing a modulation detectable by a magnetic read head. For example, the slurry may be coated onto a flexible substrate which has previously been provided with diagonal metal stripes using selective deposition or deposition and selective removal. Such metal stripes preferably have a thickness in the range 5 to 15 microns. The second electromagnet is then used to orient the magnetic particles in the slurry as before. The metal stripes can lie either on the same side of the substrate as the magnetic particles or on the opposite side. As an alternative, the striped metal layer may be deposited onto the solidified slurry layer after the solidification has taken place, so that there is less thickness modulation in the magnetic layer. This arrangement is shown in cross section in FIG. 8, where the layer 17 is a patterned metal layer, and layer 16 is the layer of solidified slurry including the magnetic particles.

In the case of metal stripes, an active read head can detect increased eddy currents in the presence of one of the metal stripes, and so can produce a signal in response to the presence or absence of metal, as well as a signal in response to the magnetic characteristics.

Figure 7:
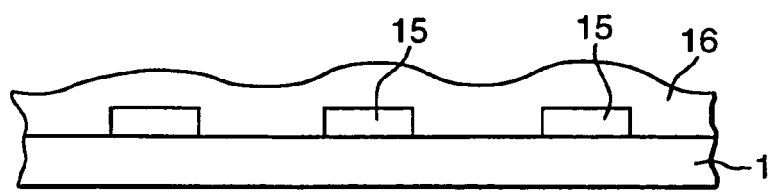
FIG. 7 shows a cross-section of a flexible magnetic tape according to the invention.

A further way of producing a detectable modulation would be to print the substrate under the slurry with a striped non-magnetic insulative layer (15). In this case the read head would detect variations in the thickness of the layer (16) including the magnetic particles, as the slurry would provide a flat surface but the underlying topography would cause variations in magnetic layer thickness. This arrangement is shown schematically in FIG. 7.

As mentioned previously, the horizontal banding in FIG. 4 made by the further magnet is superimposed on the diagonal banding made by the first magnet (or other modulation means). When the second magnet is switched on, it may orient the particles sufficiently strongly that they retain no memory of the action of the first magnet. This is shown by the uniform horizontal bands in FIG. 4, where the second magnet is on (20, 21). However, in regions where the second magnet was switched off, there will be an orientation providing a memory of the action of the first magnet. This is shown by the diagonal bands in the regions of FIG. 4 where the second magnet is switched off (22, 23). The remaining regions (24, 25) in FIG. 4, which have no hatching, indicate regions where the magnetic particles have not been aligned—i.e. regions which have experienced both magnets in the off state. Although there are three distinct states shown in FIG. 4, if it was possible to distinguish two states within regions 20 and 21 (i.e. if the regions were able to retain a memory of the condition of the first magnetic field), then 4 distinct and separately detectable regions would exist. The presence of 4 distinct regions is probably easiest to achieve by using an underlying diagonal modulation in a metallic or non-magnetic layer, rather than the two magnetic modulations of FIG. 4. It should be borne in mind that regions 24 and 25 do not have to have a completely random orientation, nor do the other regions 20, 21, 22, 23 need to be perfectly oriented. The states just need to provide measurably different respective signals in the read head in use.

The Figures are not drawn to scale. In practice the data is binary and is encoded using the well known "F2F" convention. The bit length created by the second magnet is typically about 0.65 mm for a binary zero, and 2×0.325 mm for a binary one. The bit length created by the first magnet or other modulation means may be of the order of 4 mm. Therefore the section of tape shown in FIG. 4 is of the order of 2 mm in the Y direction. The flexible substrate will typically be of the order of 15 cm across in the Y direction, and might be split into 125 threads 1.2 mm across in the Y direction, so that FIG. 4 shows a portion of substrate slightly wider than the width of a finished thread in practice. The oblique angle of the magnet will typically be 45 degrees with respect to the X direction, as in FIG. 4. Thus in FIG. 4 the X axis has been compressed by a factor of about 10, but the angle of the magnets has not been modified accordingly.

The modulation achieved by the first magnet will modulate the amplitude envelope of the signal due to the second magnet. In regions where there is no orientation by the first magnet, the modulation provided by the second magnet will be reduced by about 20 percent. The exact amplitude modulation can be adjusted using the orientation angle, field strength, and spatial extent (head gap) of the first magnet.

Figure 5:
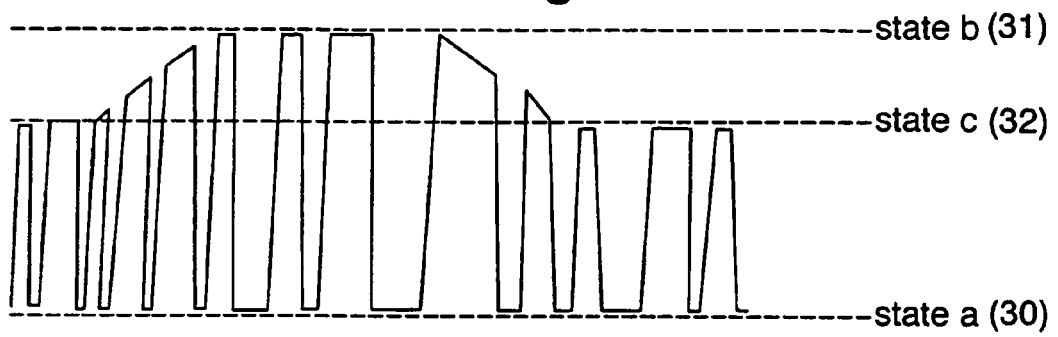
FIG. 5 shows a typical signal from a magnetic record carrier according to the invention.

In practice, a magnetic read head reading the data stored in a magnetic record carrier according to the present invention will sense a signal similar to that shown in FIG. 5. In this Figure, level 30 indicates the state in which the second magnet was on during encoding (corresponding to areas 20 and 21), level 31 indicates the state in which the second magnet was off and the first magnet was on (corresponding to areas 22 and 23), and level 32 corresponds to the state in which both magnets were off (corresponding to areas 24 and 25).

Figure 6:
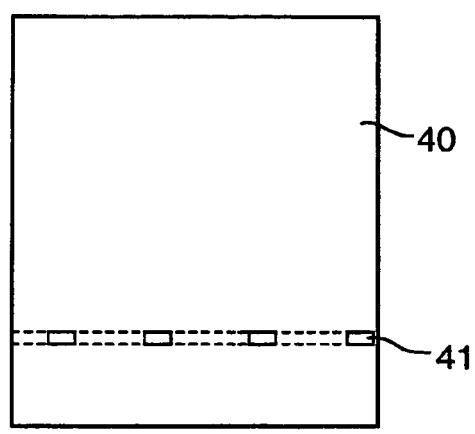
FIG. 6 shows a document having a magnetic record carrier, according to the present invention, embedded in it.

After a magnetic tape according to the present invention has been made using the above method, typically 15 cms in width (i.e. the Y direction), it can be slit into 100-150 thin threads in the X direction. These can be embedded in documents, such as for example banknotes, in the same way as metal threads are sometimes embedded. FIG. 6 shows a document (40) having a magnetic record carrier in the form of a thin tape or thread (41) embedded in it using the windowing technique.

As an alternative to the above embodiment, it is possible to use three magnets. For example, the first magnet might comprise a "preliminary" permanent magnet oriented at 20 degrees to the X direction. The second magnet might comprise an electromagnet similar to the first magnet described for the first embodiment above, this second magnet being arranged to encode data using a long bit period such as 4 mm and being oriented at 40 degrees to the X direction. The third magnet would then comprise a further electromagnet arranged to encode data using a shorter bit period, such as for example 0.7 mm. In this second embodiment, the amplitude modulation is controlled by the angular difference between two regions having orientations at two different diagonal angles, namely 20 and 40 degrees in the present example. Modulation in the X direction will typically involve pulse width modulation such as F2F encoding. Such modulation can be discriminated from amplitude modulation as described above by techniques known to persons skilled in the art.

The waveforms used in the diagonal modulation can conveniently be locked to the modulation used in the X direction. Such locking would enable the read system to compare the relative phases of the pulse width (X) modulation and the amplitude modulation. From the relative phase, the read system can compute the value on the Y axis at which a given thin thread was originally manufactured in the wide tape, and convert this to a measurement of position relative to a known absolute reference such as one edge of the substrate.

The concept of locking will be described further with reference to the first embodiment described above using two magnets. The oblique (first) magnet can be locked to a signal divided down from the lower significance digits of the X modulation of the second magnet. In the case of a pre-patterned flexible substrate having diagonal strips of metal, the X modulation could be phase locked to one Y track reading the diagonal modulation. Such locking techniques are known to persons skilled in the art.

Referring to FIG. 5, to find the value of X it is necessary to filter out the low frequency changes in amplitude and focus upon the high frequency pulse width modulations. Conversely, to find value of Y, the high frequency modulations should be filtered out to allow the low frequency signal to be detected. The position in mm from one edge of the flexible substrate is found using the phase shift between the Y and X modulated patterns. This involves comparing the measured phase shift with the known phase difference when Y=0 and the known angle of the diagonal modulation.

In another alternative scheme, an arrangement of three magnets can be used to impart a greater variation in modulation depth whilst imparting positional information in the y direction. In this scheme the first two magnets are the same as magnets 4 and 6 shown in the prior art scheme of FIG. 1. The third magnet is aligned substantially parallel to the first, and is an electromagnet such that it can be switched intermittently to selectively re-orient some of the material oriented by the second magnet. Applying a sufficiently strong field via this third magnet could reduce the modulation produced by the second magnet (6) to zero, as the particles would return to the position they were in after passing the first magnet. However, in practice this could destroy the data content in the x direction as well. Therefore, the use of the third magnet to reduce the modulation caused by the second magnet to 50% to 20% in selected areas would be preferable. Although in the embodiment described here this third magnet was aligned parallel to the first magnet, it is possible to align it at an oblique angle to both the first and second magnets to produce more complex modulation patterns. It is however doubtful that extra position information would be gained, and it would not be possible to read any significant thread width without overlapping several pattern domains within the reading head field. This last three magnet arrangement will involve the least disruption to an existing coating apparatus, as it would only require the addition of a third electromagnetic head plus a modulated power supply.

The invention claimed is:

1. A method of manufacturing flexible magnetic tape having a permanently structured magnetic characteristic which varies from place to place in two different directions in a plane of the tape, the method including:
   providing a flexible elongated substrate with a layer of material having a permanently structured magnetic characteristic which varies in a first direction making an oblique angle relative to a longest dimension of the substrate;
   coating the substrate with a slurry comprising anisotropic magnetic particles;
   moving the substrate and slurry coating relative to a magnetic field having a field strength which varies with time in a second direction making an oblique angle with the first direction, thereby;
   orienting, in response to moving the substrate, the magnetic particles on selected spaced areas of the substrate in a second direction making an oblique angle with the first direction, whereby the magnetic particles oriented in the second direction are overlaid on top of the permanently structured magnetic characteristic which varies in the first direction; and
   solidifying the slurry to fix the magnetic particles in place;
   wherein points on the tape are uniquely identifiable by a single linear movement of a read head.

2. A method as claimed in claim 1 in which the layer of material having a permanently structured magnetic characteristic is replaced by a layer of a metal having a modulated thickness which varies in first direction making an oblique angle relative to the longest dimension of the substrate, the thickness modulations being detectable by an active magnetic read head.

3. A method as claimed in claim 2 in which the layer of a metal is deposited upon the slurry that has been solidified, so that the thickness of the solidified slurry layer is substantially constant.

4. A method as claimed in claim 1 in which the layer of material having a permanently structured magnetic characteristic which varies in first direction making an oblique angle relative to the longest dimension of the substrate comprises layer including magnetic particles, the layer having a modulated thickness.

5. A method as claimed in claim 4 in which the layer of material having a permanently structured magnetic characteristic and having a modulated thickness is deposited upon the solidified slurry layer, so that the thickness of the slurry that has been solidified is substantially constant.

6. A method of manufacturing flexible magnetic tape having a permanently structured magnetic characteristic which varies from place to place in two different directions in a plane of the tape, the method including:
   a) coating a flexible substrate with a slurry comprising anisotropic magnetic particles;
   b) moving the substrate and slurry coating relative to a first magnetic field having a field strength which varies with time in a first direction;
   c) orienting, in response to the moving, the magnetic particles in a first direction, whereby the particles oriented in the first direction produce a detectable pattern oriented in the first direction;
   d) subsequently moving the substrate and slurry coating relative to a second magnetic field having a field strength which varies with time in a second direction making an oblique angle with the first direction;
   e) orienting, in response to the subsequently moving, a subset of the magnetic particles on selected spaced areas of the substrate in a second direction making in oblique angle with the first direction, whereby the subset of the particles oriented in the second direction produce a detectable pattern in the second direction which is superimposed over the detectable pattern oriented in the first direction;
   f) solidifying the slurry to fix the said particles in place;
   characterized in that the first magnetic field has a magnetic field strength which varies with time in said first direction, such that following step e) the magnetic particles are selectively oriented in spaced areas in both said first and said further directions; and
   wherein the first detectable pattern and the second detectable pattern are uniquely identifiable by a single linear movement of a read head.

7. A method as claimed in claim 6, in which the substrate is subsequently slit along either said first or said second direction to provide a plurality of lengths of tape having respective permanently structured magnetic patterns which vary in a single direction in the plane of the tape.

8. A method as claimed in claim 1, in which the substrate is subsequently slit along either said first or said second direction to provide a plurality of lengths of tape having respective permanently structured magnetic patterns which vary in a single direction in the plane of the tape.

9. The method of claim 6, further comprising:
   moving the substrate and slurry coating relative to a third magnetic field having a field strength which varies with time in a direction that is one of
   parallel to the first direction, and
   oblique to the first direction and second direction; and
   orienting a subset of the subset of magnetic particles oriented in the second direction on selected spaced areas of the substrate in a direction that is one of
   parallel to the first direction, and
   oblique to the first direction and second direction.

* * * * *